(12) United States Patent
Park et al.

(10) Patent No.: US 12,505,529 B2
(45) Date of Patent: Dec. 23, 2025

(54) VISION INSPECTION SYSTEM BASED ON DEEP LEARNING AND VISION INSPECTING METHOD THEREOF

(71) Applicants: HYUNDAI MOBIS Co., Ltd., Seoul (KR); Auburn University, Auburn, AL (US)

(72) Inventors: Jong Min Park, Yongin-si (KR); Song-Yul Choe, Auburn, AL (US); Hyuongchan Kim, Auburn, AL (US)

(73) Assignees: HYUNDAI MOBIS CO., LTD., Seoul (KR); Auburn University, Auburn, AL (US)

( * ) Notice: Subject to any disclaimer, the term of this patent is extended or adjusted under 35 U.S.C. 154(b) by 495 days.

(21) Appl. No.: 17/853,304

(22) Filed: Jun. 29, 2022

(65) Prior Publication Data
US 2023/0005131 A1    Jan. 5, 2023

Related U.S. Application Data

(60) Provisional application No. 63/217,010, filed on Jun. 30, 2021.

(30) Foreign Application Priority Data

Jun. 29, 2022    (KR) ........................ 10-2022-0079388

(51) Int. Cl.
*G06T 7/00*      (2017.01)
*G06N 3/08*      (2023.01)

(52) U.S. Cl.
CPC ............. *G06T 7/0008* (2013.01); *G06N 3/08* (2013.01); *G06T 2207/20081* (2013.01); *G06T 2207/20084* (2013.01); *G06T 2207/30248* (2013.01)

(58) Field of Classification Search
CPC ................. G06T 7/0004; G06T 7/0008; G06T 2207/20081; G06T 2207/20084;
(Continued)

(56) References Cited

U.S. PATENT DOCUMENTS 11,937,020 B2 *   3/2024   Allen .................... G06T 7/0008
2019/0096135 A1 *   3/2019   Dal Mutto ........ G06F 18/24765
(Continued)

FOREIGN PATENT DOCUMENTS

WO    WO-2022065621 A1 *   3/2022          G06T 7/0004

OTHER PUBLICATIONS

Yin, Xianfei et al., A deep learning-based framework for an automated defect detection system for sewer pipes, Automation in Construction, Alberta, Canada, vol. 109, 2020, 102967, ISSN 0926-5805, https://doi.org/10.1016/j.autcon.2019.102967 (Year: 2020).*

*Primary Examiner* — Shefali D Goradia
(74) *Attorney, Agent, or Firm* — MORGAN, LEWIS & BOCKIUS LLP

(57) ABSTRACT

The present disclosure relates to a vision inspection system based on deep learning and a vision inspection method of. The vision inspection system based on deep learning according to the present disclosure includes a GT generation module that generates a GT for a region of interest of a car part image, a learning module that receives learning data from the GT generation module, performs learning based on deep learning, and outputs a weight file, and an interface module that detects a defect with respect to an image file received from a vision program by using the weight file, and returns a defect detection result to the vision program.

11 Claims, 17 Drawing Sheets

(58) Field of Classification Search
CPC ........ G06T 2207/30248; G06N 3/0464; G06N 3/08; G06N 3/09
See application file for complete search history.

(56) References Cited

U.S. PATENT DOCUMENTS

2021/0081698 A1* 3/2021 Lindeman .......... G06Q 30/0283
2023/0005120 A1* 1/2023 Kondo .................... G06T 7/001
2024/0160194 A1* 5/2024 Bakhshmand ......... G06N 3/047

* cited by examiner

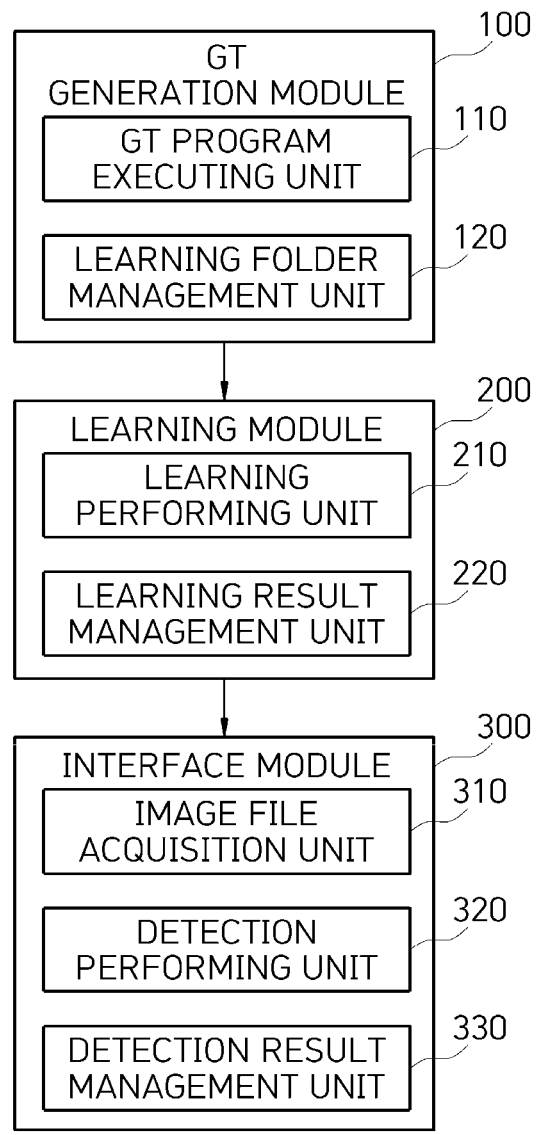

FIG. 2

| DEEP LEARNING INSPECTION | | CLOSE |
|---|---|---|
| | DATE 2020-10-19 TIME: 03:14:53 | |

DASHBOARD | PART NAME BUILDER | GT GENERATOR

TRAINING

LOAD-MODEL

AUTOMOBILE MODEL
NAME [ADA] CODE [F3F]

INSPECTION LIST

| INDEX | PART NAME | CONTRAL CODE |
|---|---|---|
| 1 | COOPERWASHERLH | |
| 2 | COOPERWASHERRH | |
| 3 | PICABLODIPTH | |
| 4 | PBCABLODIPL | |
| 5 | WSSLH | |
| 6 | WSSAN | |
| 7 | BRABAHOEBERLH | |
| 8 | BRABAHOEBERRH | |
| 9 | CALPERNHA | |
| 10 | CALPERNHA | |

NAME [      ]  [ADD]
CODE [      ]  [DELET]

SELETED INSPECTION FILE
MODEL: ADA\F3F, INSPECTION: COOPERWASHER LH

SELECT OK OR NG
[OK ▽]

CLICK TO START GT PROGRAM

[START GT PROGRAM]

GT GENERATOR

RESULT
TODAY TOTAL
OK  [6]  [6]
NG  [6]  [6]
YIELD [50] [50]  [RESET] [RESET]

FIG. 3A

| PART NAME BUILDER | | |
|---|---|---|
| LOAD-MODEL | | |
| AUTOMOBILE MODEL | | |
| NAME ADA  CODE F3F | | |
| INSPECTION LIST | | |
| INDEX | PART NAME | CONTRAL CODE |
| 1 | COOPERWASHERLH | |
| 2 | COOPERWASHERRH | |
| 3 | PICABLODIPTH | |
| 4 | PBCABLODIPL | |
| 5 | WSSLH | |
| 6 | WSSAN | |
| 7 | BRABAHOEBERLH | |
| 8 | BATOBOSEBENT | |
| 9 | CALPERNHA | |
| 10 | CALPERNHA | |

NAME ☐   [ADD]
CODE ☐   [DELET]

GT GENER...    [CLOSE]

SELETED
MODEL: COOPER
SELECT O
OK ▽
CLICK TO
START PROG

| FORMMODEL | | |
|---|---|---|
| INDEX | NAME | CODE |
| 1 | CN7 NON EPB | A300 |
| 2 | CN7 FPB | A400 |
| 3 | ADA | F3F |
| 4 | ADA DRUM | F000 |
| 5 | DN8 EPB | D000 |
| 6 | DN8 NON EPB | DWF |
| 7 | TMA 2WD | R100 |
| 8 | TMA 4WD | R300 |
| 9 | TMA-PE 2WD | RAB0 |
| 10 | TMA-PE 4WD-RSP | RAD0 |
| 11 | TMA-PE 4WD+RSP | RAF0 |

[LOAD]
[DELET]

MODEL NAME ☐
MODEL CODE ☐   [ADD]

FIG. 4

DEEP LEARNING INSPECTION                          DATE 2020-10-19 TIME: 03:14:53    [CLOSE]

DASHBOARD

TRAINING

GT GENERATOR

RESULT
TODAY TOTAL
OK    [6]  [6]
NG    [6]  [6]
YIELD [50] [50]
[RESET] [RESET]

DATA SELECTION

MODEL NAME

| INDEX | NAME | CODE |
|---|---|---|
| 1 | CN7 NON EP8 | A300 |
| 2 | CN7 EP8 | A400 |
| 3 | ADA | F3F |
| 4 | ADA DRUM | F000 |
| 5 | DN8 EPB | D000 |
| 6 | DN8 NON EPB | DWF |
| 7 | TMA 2MD | B100 |

INSPECTION NAME

| INDEX | NAME | CODE |
|---|---|---|
| 1 | COOPERWASHERLH | |
| 2 | COOPERWASHERRH | |
| 3 | PICABLODIPTH | |
| 4 | PBCABLODIPL | |
| 5 | WSSLH | |
| 6 | WSSAN | |
| 7 | BRABAHOEBERLH | |

IF INSPECTION NAME IS SELETED, CLICK >>>   [READY TO TRAIN]

TRAIN

* CHECK UP FILES *
(1) FILE : CONFIG.OBJ  [        ]
(2) FILE : OBJ.NAMES   [        ]
(3) FILE : TRAIM.TXT   [        ]

* START TRAIN *

[ START ]   [ STOP ]

FIG. 5A

DATA SELECTION

MODEL NAME

| INDEX | NAME | CODE |
|---|---|---|
| 1 | CN7 NON EP8 | A300 |
| 2 | CN7 EP8 | A400 |
| 3 | ADA | F3F |
| 4 | ADA DRUM | F000 |
| 5 | DN8 EPB | D000 |
| 6 | DN8 NON EPB | DWF |
| 7 | TMA 2MD | B100 |

INSPECTION NAME

| INDEX | NAME | CODE |
|---|---|---|
| 1 | COOPERWASHERLH | |
| 2 | COOPERWASHERRH | |
| 3 | PICABLODIPTH | |
| 4 | PBCABLODIPL | |
| 5 | WSSLH | |
| 6 | WSSAN | |
| 7 | BRABAHOEBERLH | |

IF INSPECTION NAME IS SELETED, CLICK >>>

TRAIN

* CHECK UP FILES *

(1)FILE : CONFIG.OBJ (2)FILE : OBJ.NAMES (3)FILE : TRAIN.TXT

* START TRAIN *

START    STOP

[READY TO TRAIN]

| MANUAL TEST | | | | | | | — ☐ ✕ |
|---|---|---|---|---|---|---|---|
| IMAGE LIST | | MODEL AND PART NAME | | | | | PREVIEW |
| | FILENAME | INDEX | NAME | CODE | | INDEX | NAME |
| ▲ | CHAT.PNG | 1 | CN7 NON EPB | A300 | | | |
| | CHAT F3F COOPER WASHER H.PNG | 2 | CN7 EPB | A400 | | | |
| | | 3 | ADA | F3F | | | |
| | | 4 | ADA DRUM | F000 | | | |
| | | 5 | DNS EPB | D000 | | | |
| | | 6 | DNS NON EPB | DWF | | | |
| | | 7 | TMA 2WD | R100 | | | |
| | | 8 | TMA 4WD | R300 | | | |
| | | 9 | TMA-PE 2WD | RAB0 | | | |
| | | 10 | TMA-PE 4WD-RSP | RAD0 | | | |
| | | 11 | TMA-PE 4WD+RSP | RAF0 | | | |
| | DETECT ONE | SET | MODEL CODE ☐ | PART NAME ☐ | | | |
| RESULT | | | | | | | |
| TYPE | | CONFIDENCE | X | Y | WIDTH | HEIGHT | |

MODE
AUTO
CONNECT OP PC
STOP
MANUAL TEST

VISION INSPECTION SYSTEM BASED ON DEEP LEARNING AND VISION INSPECTING METHOD THEREOF

CROSS-REFERENCE TO RELATED APPLICATION

This application claims priority to and the benefit of U.S. Application No. 63/217,010, filed on Jun. 30, 2021, and Korean Patent Application No. 10-2022-0079388, filed on Jun. 29, 2022, the disclosure of which is incorporated herein by reference in its entirety.

BACKGROUND

1. Technical Field

The present disclosure relates to a vision inspection system based on deep learning and a vision inspection method thereof.

2. Related Art

According to the prior art, final inspection of a module line is automatically performed using a vision inspection system. The vision inspection system uses pattern, blob and color tools to check the quality of an assembled module and detect a defect of the module.

When a vision program determines that the module is defective, the module line has to be stopped immediately, and an operation thereof has to be stopped until an operator identifies and handles the defect. In addition, there is a problem regarding an error detection rate in the module line such as a chassis module, and the current error detection rate for NG is counted at approximately 5%.

SUMMARY

The present disclosure has been made in an effort to solve the problems in the related art, and an object of the present disclosure is to provide a chassis module vision inspection system based on deep learning capable of rapidly performing an entire process of acquiring a defective image from a vision program and returning an inspection completion result to the vision program within a preset time per single image, and converging a detection error rate to 0%, and a vision inspection method of the chassis module vision inspection system.

Various embodiments are directed to a vision inspection system based on deep learning including: a GT generation module that generates a GT for a region of interest of a car part image; a learning module that receives learning data from the GT generation module, performs learning based on deep learning, and outputs a weight file; and an interface module that detects a defect with respect to an image file received from a vision program by using the weight file, and returns a defect detection result to the vision program.

The GT generation module stores information, in which a bounding box is generated on an inspection part image, in a learning folder.

OK data, NG data, a Cfg file, a pretrained weights file, and object name information are stored in the learning folder.

The learning module performs learning on designated car parts by using a YOLO learning model, and outputs the weight file as a learning result.

The learning module stores the weight file in a designated directory folder.

The interface module is connected to the vision program by using an Ethernet TCP/IP protocol interface.

The interface module receives the weight file and a configuration file from the learning module, detects a part defect by using a YOLO detection model, and controls a detection result to be displayed on a screen.

Various embodiments are directed to a vision inspection method of based on deep learning, the method including: step (a) of generating a ground truth for a region of interest of a car part image; step (b) of performing learning based on deep learning by using learning data generated in step (a), and outputting a weight file; and step (c) of detecting a defect in the car part image by using the weight file, and providing a bounding box and a determination result on whether there is the defect in the car part image.

Step (a) includes generating and storing GT information as a text file by using an image annotation open source.

Step (b) includes performing learning on designated car parts by using a YOLO learning model, and outputting the weight file as a learning result.

Step (c) includes obtaining the car part image, which is a raw image file from a vision program using Ethernet TCP/IP protocol, determining whether there is a defect in the car part image by using a YOLO detection model, controlling the determination result to be displayed on a screen, and returning the determination result to the vision program.

According to the embodiments of the present disclosure, all parts of a car model may be learned, a defect may be detected through image analysis, a detection error rate may be reduced close to 0%, downtime of a module line may be dramatically shortened, and production efficiency may increase.

The effects of the present disclosure are not limited to the aforementioned effects, and other effects, which are not mentioned above, may be clearly understood by those skilled in the art to which the present disclosure pertains from the following descriptions.

BRIEF DESCRIPTION OF THE DRAWINGS

FIG. 1 illustrates a vision inspection system based on deep learning according to an embodiment of the present disclosure.

FIG. 2 illustrates a GT generation screen according to an embodiment of the present disclosure.

FIG. 3A to FIG. 3D illustrate a GT generation process according to an embodiment of the present disclosure.

FIG. 4 illustrates a learning screen according to an embodiment of the present disclosure.

FIG. 5A to FIG. 5D illustrate a learning process according to an embodiment of the present disclosure.

FIG. 7A to FIG. 7D illustrate an inspection process according to an embodiment of the present disclosure.

DETAILED DESCRIPTION

Figure 3B:
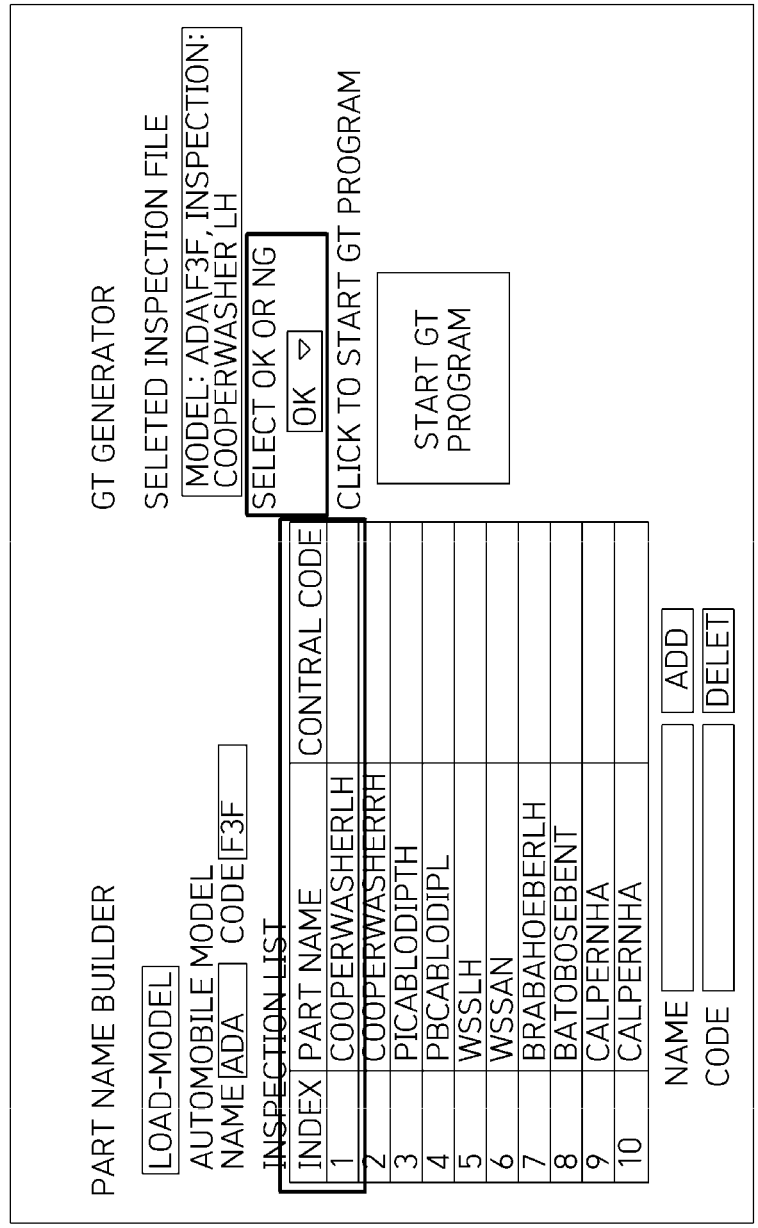

The above-described objects, and other objects, advantages and features of the present disclosure and methods of achieving the objects, advantages and features will be clear with reference to embodiments described in detail below together with the accompanying drawings.

However, the present disclosure is not limited to the embodiments disclosed herein but will be implemented in various forms. The embodiments of the present disclosure are provided so that a person with ordinary skill in the art can easily understand the objects, configurations and effects of the present disclosure. The present disclosure will be defined only by the scope of the appended claims.

Meanwhile, the terms used in the present specification are for explaining the embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude the presence or addition of one or more other constituent elements, steps, operations, and/or elements.

FIG. 1 illustrates a vision inspection system based on deep learning according to an embodiment of the present disclosure.

A GT generation module 100 includes a GT program executing unit 110 that executes a GT program. The GT program organizes data on the basis of a car model and parts.

The GT program executing unit 110 outputs an OK file and an NG file, and the OK file and the NG file each include an image file and a bounding box.

A learning folder management unit 120 of the GT generation module 100 stores and manages the OK file and NG file, and OK data, NG data, a Cfg file, a pretrained weights file and object names are stored in a learning folder.

A learning module 200 includes a learning performing unit 210 and a learning result management unit 220.

The learning performing unit 210 performs learning by using a YOLO-v3 training model, i.e., darknet.exe, and the learning result management unit 220 stores a weight file for each car model, and transmits the learning result to a detection performing unit 320 of an interface module 300.

YOLO (You Only Look Once) uses a one stage detector to pass one image through a neural network once, and thus has a significantly high detection speed. The image is divided into several grid cells, and each of the cells has a pixel size and a center point. A plurality of anchor boxes with a fixed width and height are generated in each of the cells. Parameters, which are information of each of the anchor box, include a probability that there is an object in a corresponding cell, x and y values of the corresponding cell, and width and height values of an anchor box in the corresponding cell. Information of each of the cells consists of class probabilities, i.e., a percentage for each class of a corresponding bounding box, and bounding box parameters.

The order in which the results are derived is as follows. A letter box image is generated from network input, and trained data, i.e., weight, a network model and an image are inputted to GoogLeNet as an input. A fully connected layer is transformed to fit the size of a grid cell, and a class confidence score for each bounding box is calculated. Subsequently, an overlapping box is removed through non-maximum suppression (NMS), and a final box is drawn.

The interface module 300 performs a dashboard function, and an image file acquisition unit 310 acquires a raw image file from a vision program by using an Ethernet TCP/IP protocol (Transmission Control Protocol/Internet Protocol).

The detection performing unit 320 reads information on the car model and parts, and calls an appropriate weight and configuration file, by using a YOLO v3-detection model.

A detection result management unit 330 receives a defect detection result (output from detection) from the detection performing unit 320, and controls the defect detection result to be displayed on a screen. At this time, an image including a bounding box and the information on the car model are provided.

The detection result management unit 330 stores an irradiated image in a saving folder in real time, and transmits an output to the vision program by using the Ethernet TCP/IP protocol.

FIG. 2 illustrates a GT generation screen according to an embodiment of the present disclosure, and FIG. 3A to FIG. 3D illustrate a GT generation process according to an embodiment of the present disclosure.

The GT generation module 100 provides generation and deletion functions for a model and parts, and generates a GT, i.e., a region of interest (ROI).

The GT generation module 100 generates one GT for each image, and it takes 10 minutes on average to generate 100 GTs for one part.

The GT generation module 100 generates and stores GT information as a text file by using an image annotation open source.

The GT generation module 100 generates a box on an image in which an inspection part is present.

This box is called a GT (Ground Truth), and YOLO v3 requires locational information of a training object as one of supervised learning.

Through the GT generation module 100, it is possible to add and delete a car model and parts depending on user needs, and a list of car information is managed as an INI file in the background. When an inspection part is added, a directory folder for learning is automatically generated, and a class file and a configuration file are generated at this time. A collected training image is saved in designated folders OK and NG. When dataset is prepared and a car model and parts are selected, the GT is generated through a GT program, i.e., an annotation program.

Referring to FIG. 3A, a form model is inputted, and the model is selected and loaded.

Referring to FIG. 3B, an inspection part and a class, i.e., OK or NG, is selected.

Figure 3C:
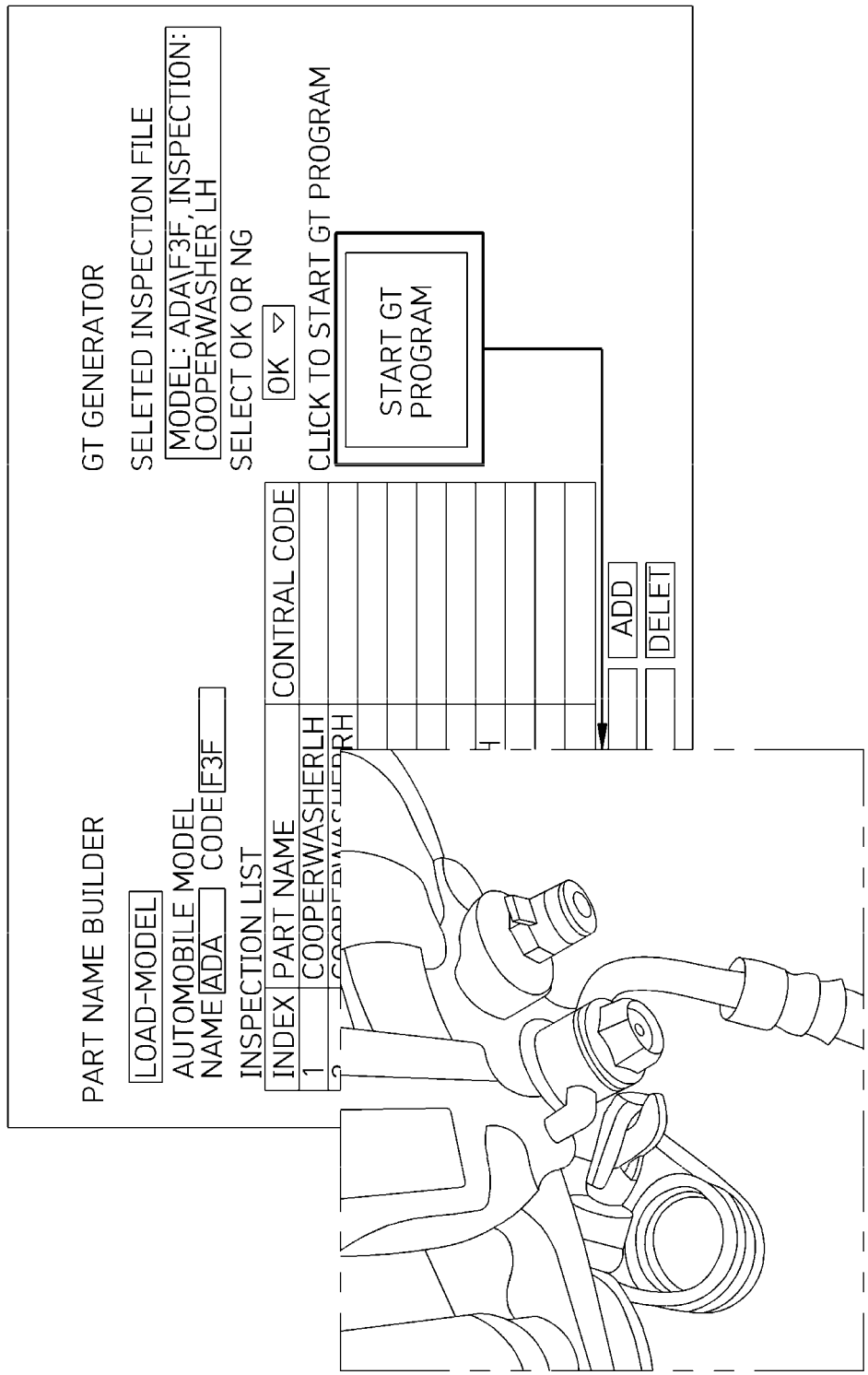

Referring to FIG. 3C, the GT program is loaded according to "Start GT Program".

Figure 3D:
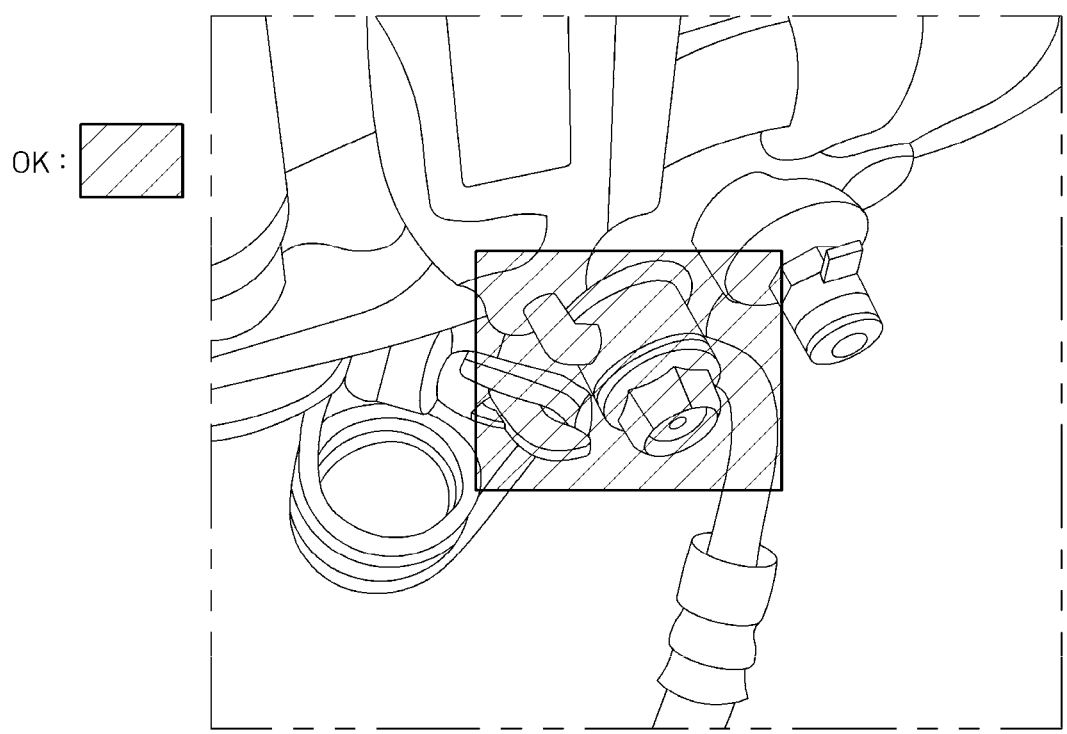

Referring to FIG. 3D, a GT box is generated through a mouse drag.

FIG. 4 illustrates a learning screen according to an embodiment of the present disclosure, and FIG. 5 illustrates a learning process according to an embodiment of the present disclosure.

The learning module 200 performs learning on a designated part, and generates a weight file according to the learning.

It takes about 30 minutes to 1 hour to perform learning for one part.

The learning module 200 performs the learning by using a Darknet learning program, i.e., Darknet.exe, which is a learning program of a YOLO algorithm, as an open source.

After the GT is generated, the selected inspection part is learned by the YOLO algorithm.

Unlike a vision tool based on a rule, a deep learning model operates on the basis of data, and thus model performance is determined by how well the model is trained.

The learning is performed using Darknet.exe, which is a program for a YOLO model created on a Darknet platform, i.e., C code.

In order to execute this program, a Cfg file, object data and an image directory, i.e., .txt file, are set as parameters.

When the inspection part has been previously learned, the existing weight file is automatically loaded, and when the inspection part has not been previously learned, the pre-trained weights file is used.

During the learning, a weight file is generated in a designated directory folder, which makes it possible to perform real-time detection.

Referring to FIG. 5A, a car model and inspection parts to be learned are selected.

Figure 5B:
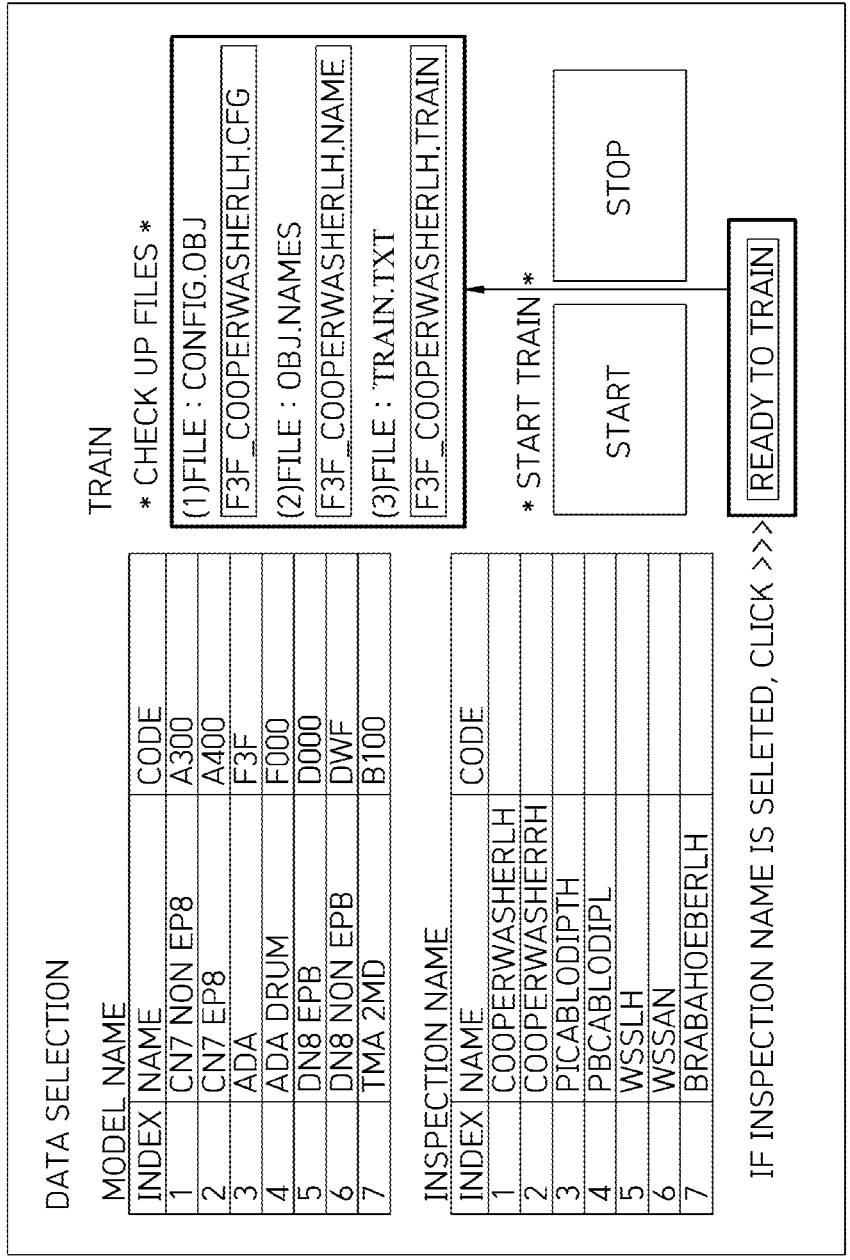

Referring to FIG. 5B, "Ready to train" is clicked, and it is checked whether Cfg, obj.names and train.txt files are set.

Figure 5C:
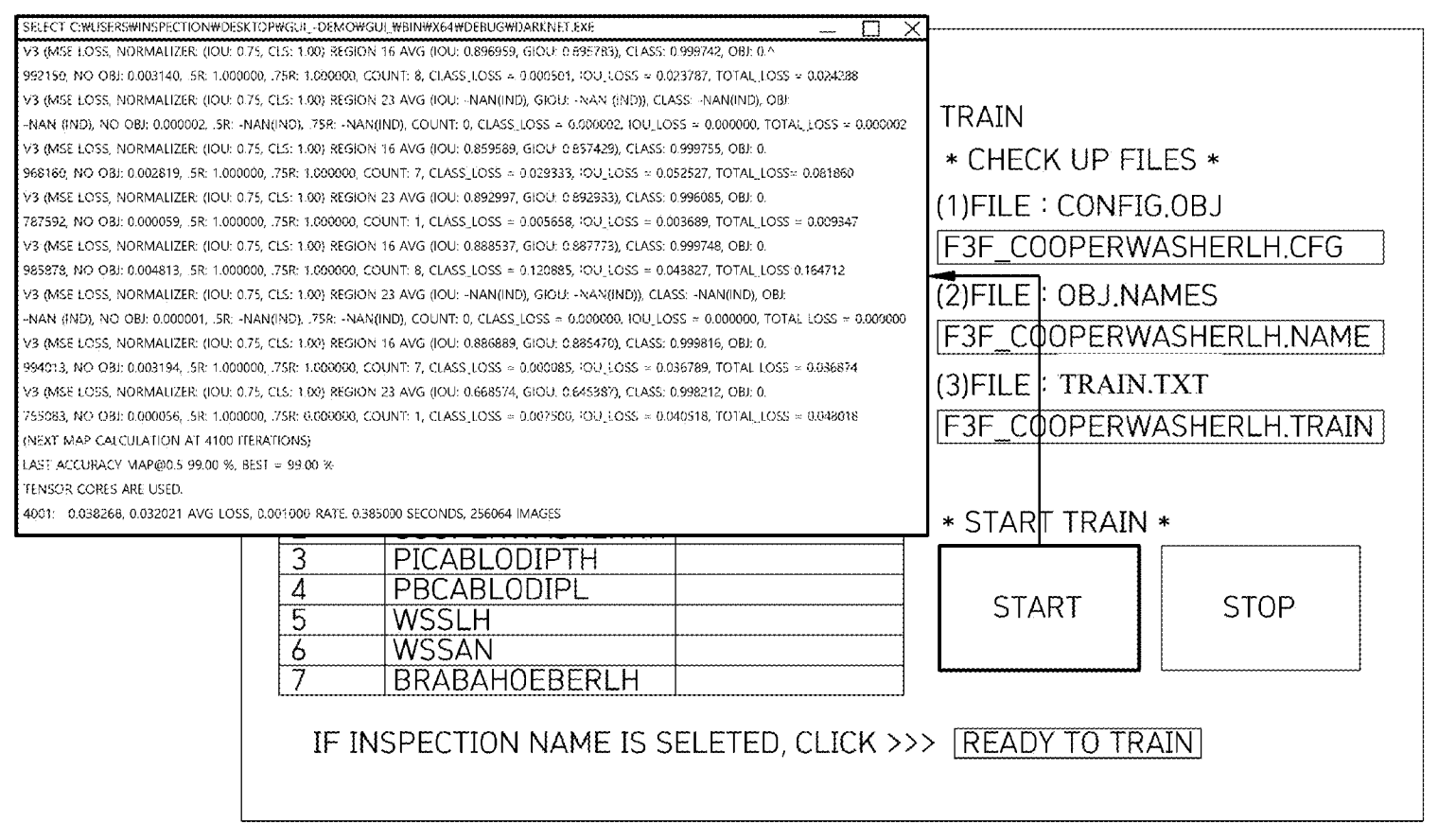

Referring to FIG. 5C, "Start" is clicked, and the learning program, i.e., Darknet. exe, is executed.

Figure 5D:
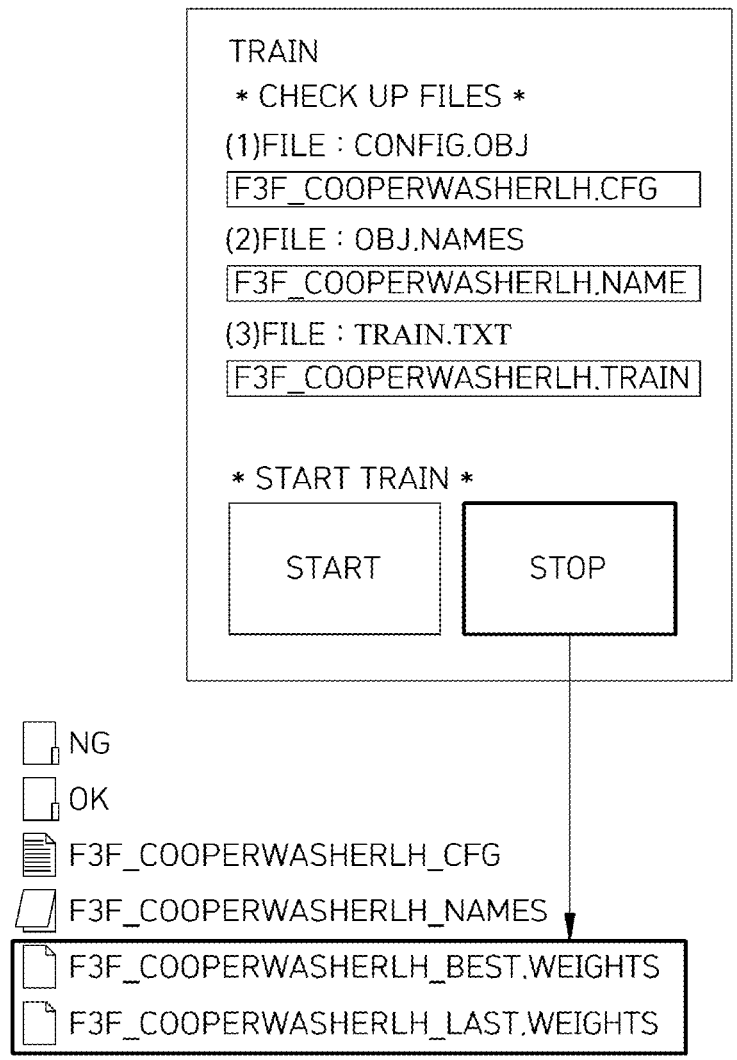

Referring to FIG. 5D, after the learning, a weight file is automatically generated in a specific directory.

Figure 6:
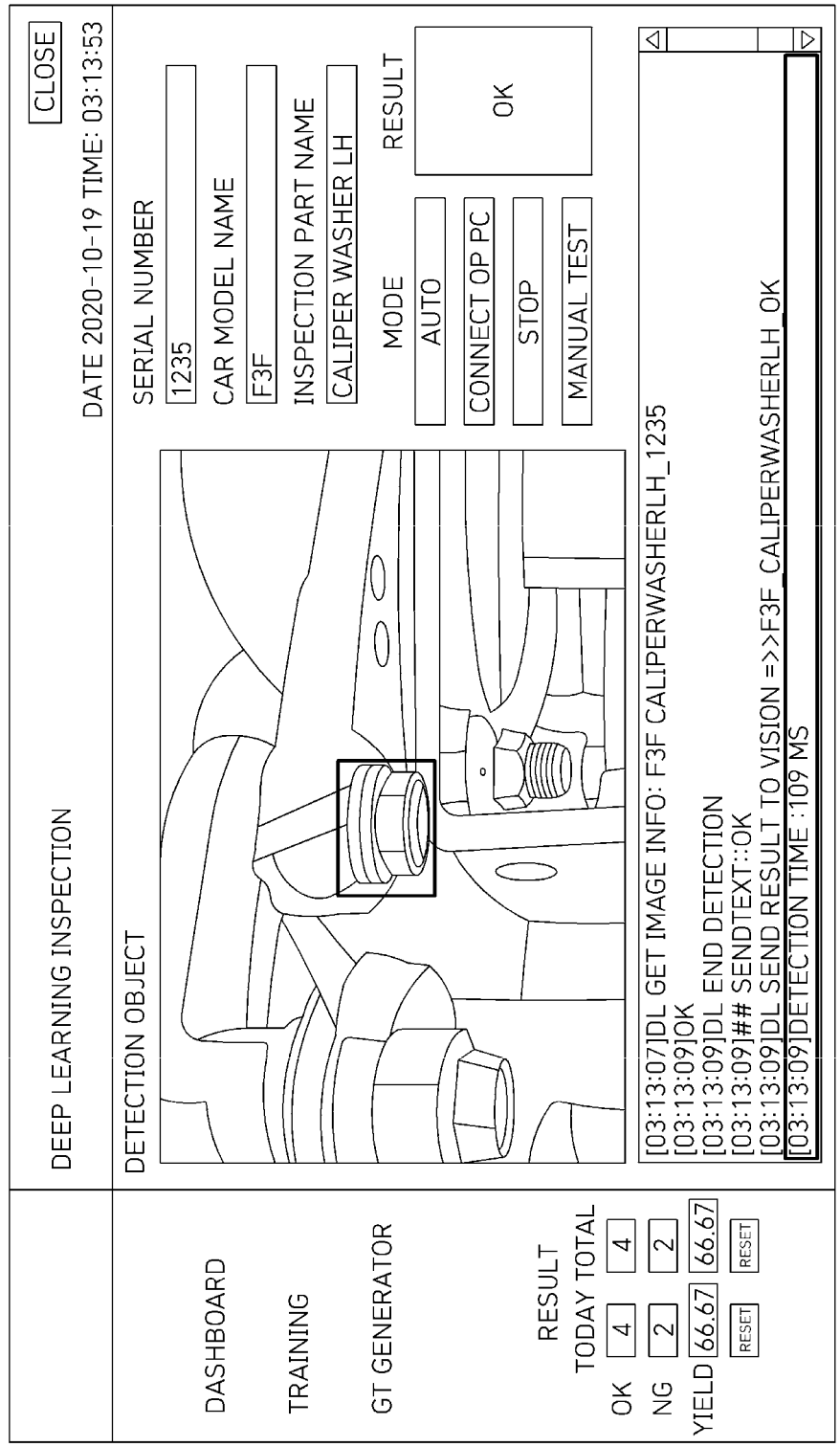
FIG. 6 illustrates a dashboard screen according to an embodiment of the present disclosure.

FIG. 6 illustrates a dashboard screen according to an embodiment of the present disclosure, and FIG. 7 illustrates an inspection process according to an embodiment of the present disclosure.

An interface module is connected to a vision inspection program through Ethernet, and provides auto inspection and manual inspection functions.

The auto inspection is performed within 2 seconds per image, the manual inspection is performed within 1 second per image, and the automatic inspection and the manual inspection use a YOLO wrapper, i.e., wrapping code from C to C#, which is an open source.

After learning, a test is performed manually through the interface module, and when the performance of a learning model is confirmed to be good, the learning model is applied to the automatic inspection of a module line.

A deep learning program using a TCP IP protocol is connected to the vision inspection program, and transmits and receives data.

The dashboard screen displays the type of inspection, loads the weight file, and uses a YOLO detection model.

During the manual inspection, a test may be performed on all images in a specific folder, and the auto inspection is used for real-time inspection with a vision program.

Referring to FIG. 7A, when "MANUAL TEST" is clicked, a manual test form is loaded.

Figure 7B:
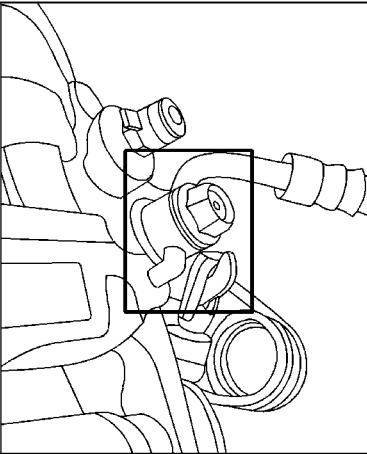

Referring to FIG. 7B, a car model and parts are selected, and the manual inspection is performed.

Figure 7C:
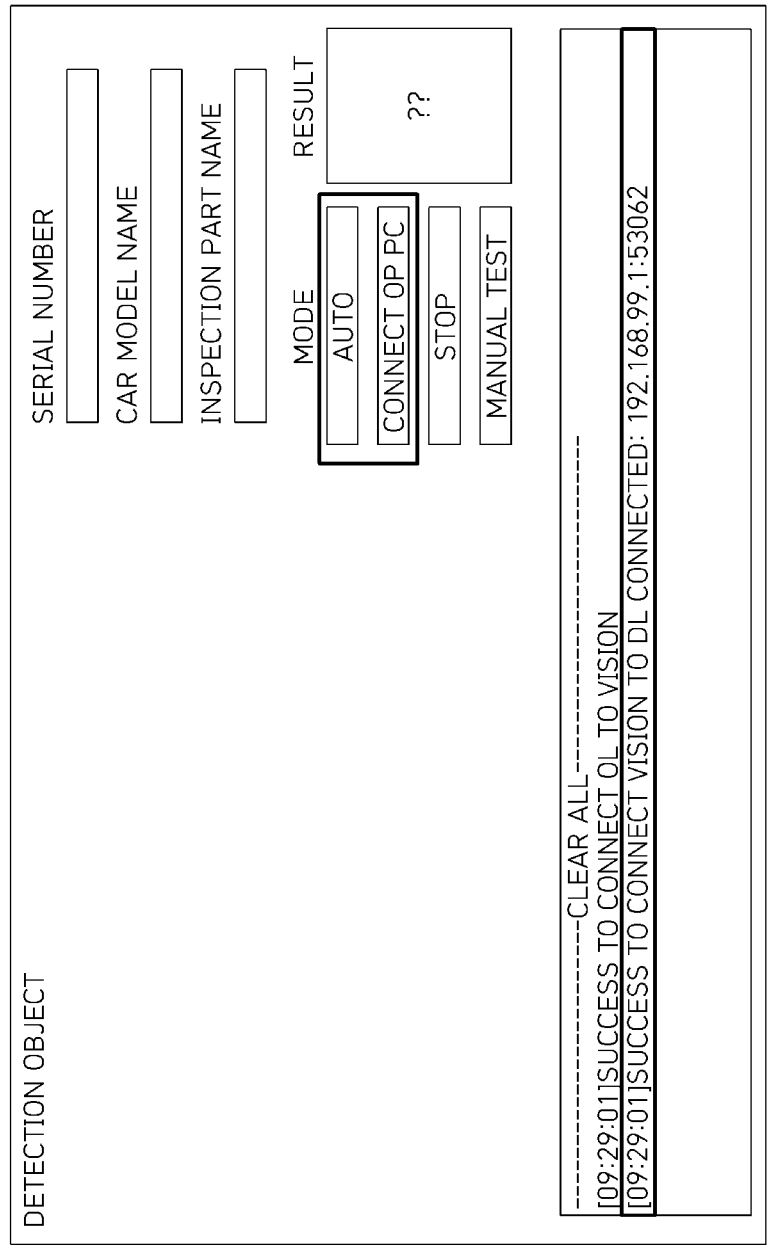

Referring to FIG. 7C, "AUTO" and "Connect OP.PC" are clicked, and a log box at the bottom is checked to confirm the connection.

Figure 7D:
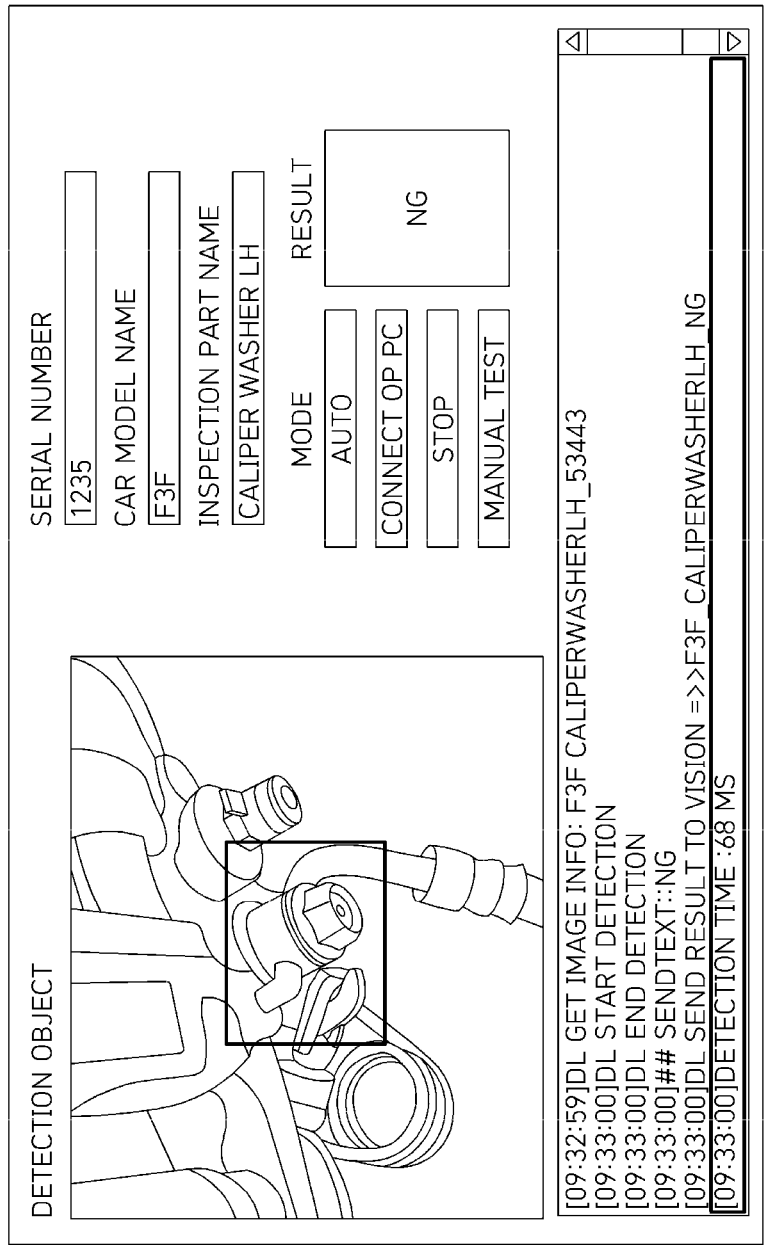

Referring to FIG. 7D, when the connection is confirmed, the program automatically inspects the image and outputs the result.

Figure 8:
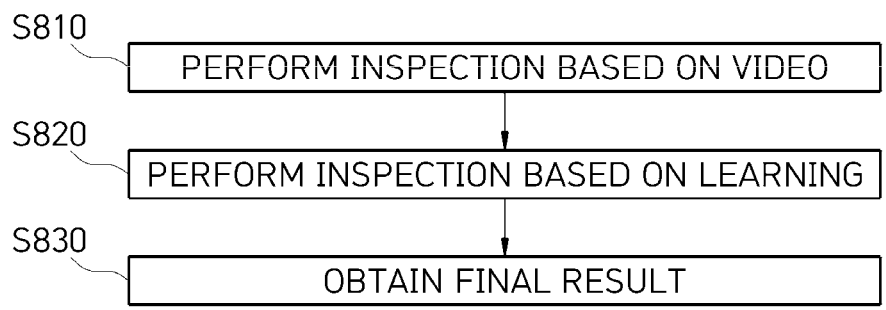
FIG. 8 illustrates a vision inspection method of based on deep learning according to an embodiment of the present disclosure.

FIG. 8 illustrates a vision inspection method of based on deep learning according to an embodiment of the present disclosure.

In step S810, inspection based on a video is performed. The inspection is performed on all parts for each stage, and when a defective part is found, the inspection stops, and a defective part image and part information are transmitted.

In step S820, inspection based on learning is performed. At this time, the inspection based on learning using a YOLO-v3 training model, i.e., darknet.exe, is performed. The inspection starts to be performed on an image received from a vision program, a detection result and the part information are displayed, and the detection result is transmitted to the vision program.

In step S830, a final vision inspection result is obtained. The detection result obtained from a deep learning program is applied, the inspection is continuously performed on the other parts, and the final detection result in a module line is obtained.

Meanwhile, the method according to the embodiments of the present disclosure may be implemented in a computer system or recorded in a recording medium. The computer system may include at least one processor, a memory, a user input device, a data communication bus, a user output device, and storage. Each of the above-described components performs data communication through the data communication bus.

The computer system may further include a network interface coupled to a network. The processor may be a central processing unit (CPU) or a semiconductor device that processes instructions stored in a memory and/or storage.

The memory and storage may include various types of volatile or non-volatile storage media. Examples of the memory may include a read only memory (ROM) and a random access memory (RAM).

Accordingly, the method according to the embodiments of the present disclosure may be implemented as a computer-executable method. When the method according to the embodiments of the present disclosure is performed in a computer device, computer-readable instructions may perform the method according to the embodiments of the present disclosure.

The method according to the embodiments of the present disclosure may be implemented as a computer-readable code in a computer-readable recording medium. The computer-readable recording medium includes all types of recording medium in which data that can be read by a computer system is stored. Examples of the medium may include a ROM, a RAM, a magnetic tape, a magnetic disk, a flash memory and an optical data storage. In addition, the computer-readable recording medium may be dispersed to the computer system connected through a computer communication network, and stored and executed as a readable code in a dispersed manner.

According to the embodiments of the present disclosure, all parts of a car model may be learned, a defect may be detected through image analysis, a detection error rate may be reduced close to 0%, downtime of a module line may be dramatically shortened, and production efficiency may increase.

While the configuration of the present disclosure has been described above in detail with reference to the accompanying drawings, the description of the configuration is for illustrative purposes only, and various modifications and alterations may of course be made by those skilled in the art without departing from the technical spirit of the present disclosure. Accordingly, the protection scope of the present disclosure should not be limited by the above-mentioned embodiments but should be determined by the appended claims.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A vision inspection system based on deep learning, the vision inspection system comprising:
   a ground truth (GT) generation module that selects a car model and parts among a plurality of car models and generates a GT box for a region of interest on a car part image of the selected parts associated with the selected car model to generate learning data;
   a learning module that receives the learning data from the GT generation module, performs learning based on deep learning, automatically generates a weight file for each car model, and outputs the weight file; and
   an interface module that detects a part defect with respect to an image file received from a vision program by using the weight file, and returns a part defect detection result to the vision program.

2. The vision inspection system of claim 1, wherein the GT generation module stores information, in which a bounding box is generated on an inspection part image, in a learning folder.

3. The vision inspection system of claim 2, wherein good data, not good data, a configuration (Cfg) file, a pretrained weight file, and object name information are stored in the learning folder.

4. The vision inspection system of claim 1, wherein the learning module performs learning on designated car parts by using a YOLO (You Only Look Once) training model, and outputs the weight file as a learning result.

5. The vision inspection system of claim 4, wherein the learning module stores the weight file in a designated directory folder.

6. The vision inspection system of claim 1, wherein the interface module is connected to the vision program by using an Ethernet TCP/IP protocol (Transmission Control Protocol/Internet Protocol) interface.

7. The vision inspection system of claim 1, wherein the interface module receives the weight file and a configuration file from the learning module, detects the part defect by using a YOLO (You Only Look Once) detection model, and controls the part defect detection result to be displayed on a screen.

8. A vision inspection method of based on deep learning, the method comprising:
   step (a0) of selecting a car model and parts among a plurality of car models;
   step (a) of generating a ground truth box for a region of interest on a car part image of the selected parts associated with the selected car model to generate learning data;
   step (b) of performing learning based on deep learning by using the learning data generated in step (a), automatically generating a weight file for each car model, and outputting the weight file; and
   step (c) of detecting a defect in the car part image by using the weight file, and providing a bounding box and a determination result on whether there is the defect in the car part image.

9. The method of claim 8, wherein step (a) includes generating and storing GT information as a text file by using an image annotation open source.

10. The method of claim 8, wherein step (b) includes performing learning on designated car parts by using a YOLO (You Only Look Once) learning model, and outputting the weight file as a learning result.

11. The method of claim 8, wherein step (c) includes obtaining the car part image, which is a raw image file from a vision program using Ethernet TCP/IP protocol (Transmission Control Protocol/Internet Protocol), determining whether there is the defect in the car part image by using a YOLO (You Only Look Once) detection model, controlling the determination result to be displayed on a screen, and returning the determination result to the vision program.

* * * * *